Patented June 18, 1946

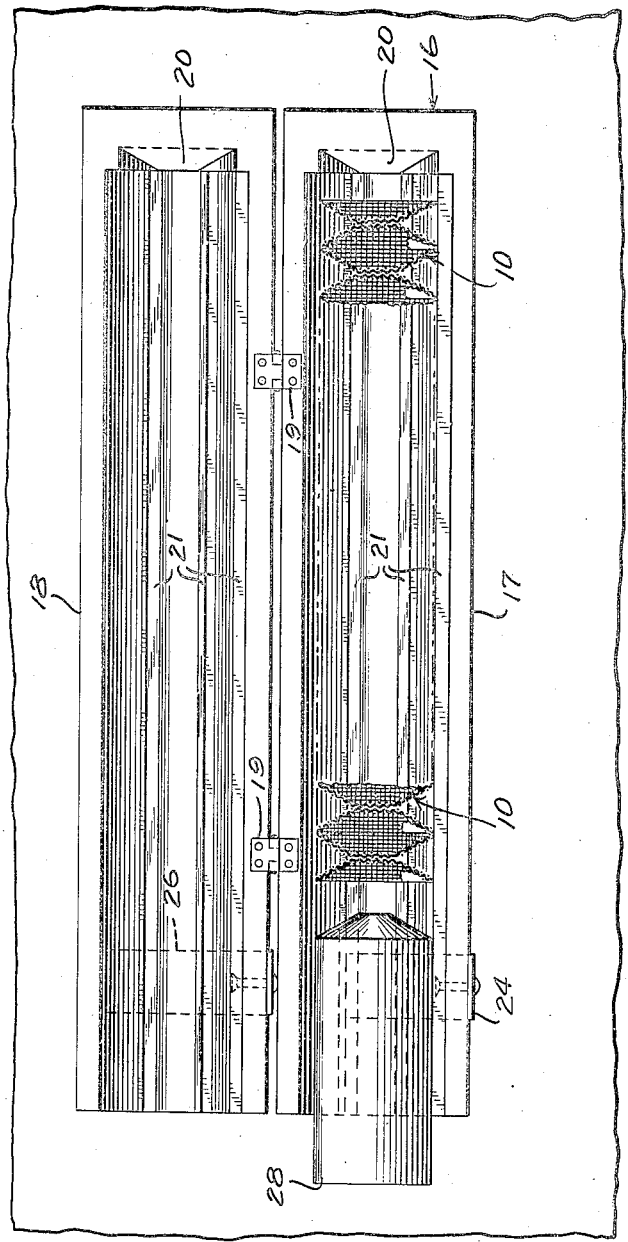

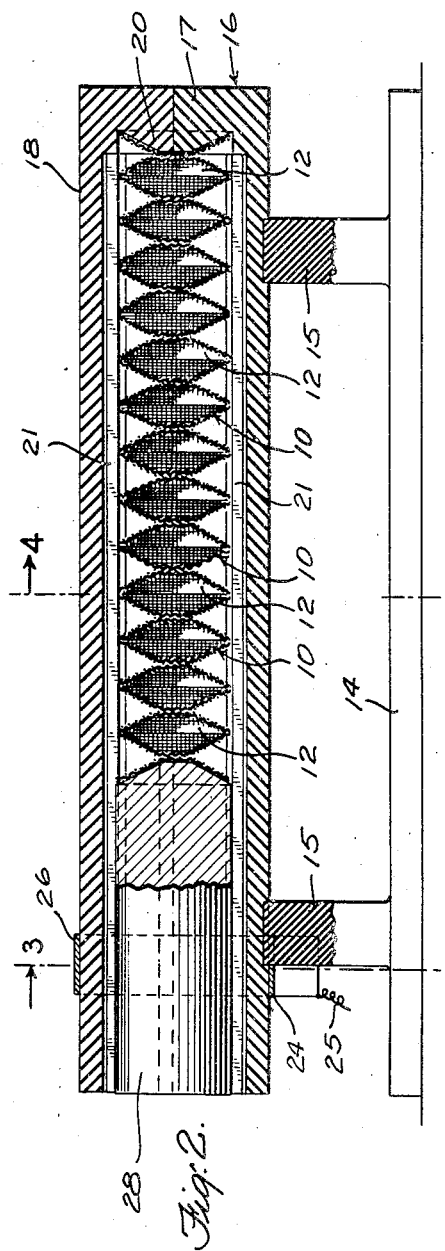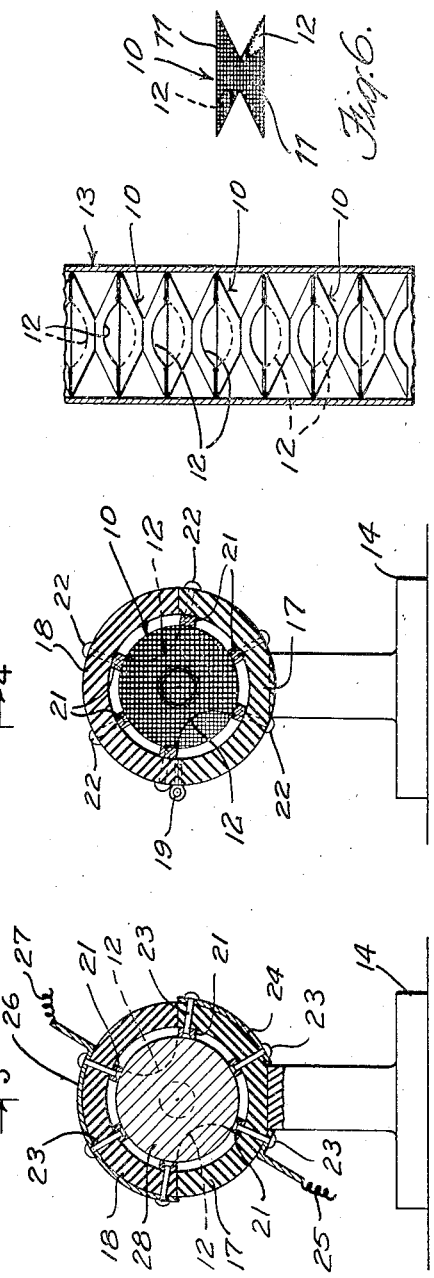

2,402,178

UNITED STATES PATENT OFFICE 2,402,178

WELDING JIG

Leif Nilssen, Westerleigh, Staten Island, N. Y., and Salvatore Joseph Finelli, Rahway, N. J., assignors to Foster Wheeler Corporation, New York, N. Y., a corporation of New York Application December 29, 1943, Serial No. 516,066

12 Claims. (Cl. 219—17)

This invention relates to jigs and fixtures, and more particularly pertains to jigs for the electric resistance welding of articles together.

The invention is particularly well adapted to the quick and economical welding together of units or sections of metallic capillary material such as wire mesh, to be used as packing for fractionating columns, scrubbers, and the like, of the type described in United States patent to D. F. Stedman, No. 2,227,164 granted December 31, 1940, although the invention is not limited thereto.

The invention will be understood from the following description when considered in connection with the accompanying drawings forming a part thereof, and in which:

Fig. 1 is a plan view of a jig embodying the invention, arranged for welding together sections of packing of wire mesh of the form shown in Fig. 6, with the hinged cover of the jig in open position, Fig. 2 is a vertical, longitudinal sectional view of the jig shown in Fig. 1, but with the cover in closed position, Fig. 3 is a sectional view taken on line 3—3 of Fig. 2, Fig. 4 is a sectional view taken on line 4—4 of Fig. 2, Fig. 5 is a vertical sectional view of part of a contacting column having conical type wire mesh packing, the sections of which are welded together in a jig embodying the invention, and Fig. 6 is an elevation of a section of the packing shown in Figs. 1 to 5 which is welded at its periphery to other sections with a jig embodying the invention.

Like characters of reference refer to the same parts throughout the several views.

The invention will be disclosed as applied to the welding together at their peripheries, of sections 10 of wire mesh packing of the type shown in Fig. 6. Each section 10 consists of two comparatively flat, truncated conical-shaped discs 11 of wire mesh preferably, which are welded together base to base. The mesh is such that the liquid being treated will completely seal the openings therein, while larger openings 12 which are not sealed by the liquid, are provided for the passage of the gases or vapors under treatment. As used herein and in the claims, the word "vapor" includes "gas."

The discs 11 are welded together at their bases to form sections 10 in relationship to each other so that the vapor passages are at diametrically opposed positions. The sections 10 are welded together at spaced points about their peripheral edges to form a packing for a fractionating column, scrubber or the like 13, with the sections arranged with respect to each other so that the vapor passages 12 in adjacent discs are diametrically opposed. It will be understood that the packing is so arranged in the column 13 that the liquid introduced at the top of the column will have a continuous path downwardly over the packing and the vapor introduced at the bottom of the column will have a continuous path upwardly over the surfaces of the units and through the vapor openings 12, each phase without hindrance by the other, and preferably with maximum contact between the two phases.

The form of jig selected for illustration, includes a base 14, vertical standards 15 extending upwardly from the end portions of the base, and a work-holding body 16 having a lower stationary portion 17 and an upper movable portion 18 which is connected by hinges 19 to the lower portion. The base, standards and body portions of the jig are made of some electrical nonconducting material such as "Bakelite," plastic or the like. The body portion 16 is tubular in shape and is of somewhat larger diameter than the diameter of the packing sections 10 as clearly indicated in Figs. 3 and 4. The body portion also is closed at one end and is open at the opposite end. The closed end is provided with a convex portion 20 which is shaped to conform to the configuration of a unit 11 of the packing.

The lower and upper sections 17 and 18 of the work-holding body portion of the jig, each are provided with a plurality of strips 21 of electrical contacting material, preferably copper, which extend longitudinally along the interior walls of the lower and upper sections of the body portion, and are secured in position by any suitable means such as the rivets 22 shown. As illustrated, the lower and upper sections of the body portion each are provided with three strips 21, but it will be understood that any suitable number more or less than three, may be employed. The strips 21 are disposed in the lower and upper sections in the positions at which it is desired welds be made to secure the packing sections together, and will be disposed with the form of packing illustrated, so that the welds will be made between the vapor openings. The strips 21 of the lower section 17 are connected through suitable electrical connecting means 23 with an arcuate contact strip 24 which is secured to the outside of the section for a portion of its circumference and which is connected to one side of a power circuit through wiring 25. The strips 21 of the upper section 18, also are connected through suitable connections 23 with an arcuate contact strip 26, which is connected to the other side of the electrical power circuit through wiring 27. The electrical connections to the power circuit are such as to permit the upper section 18 to be opened and closed freely. A cylindrical holding member 28, which is adapted to move freely inwardly and outwardly of the open end of the body portion, has a convex inner end portion of substantially the same configuration as that of a unit 11 of the packing to be welded.

In operation, assuming that packing previously welded in the jig has been removed therefrom and the upper section 18 is in open position as shown in Fig. 1, packing sections 10 are placed in the lower section 17 of the body portion with their edges in contact with the contact strips 21 in the manner illustrated in Figs. 1, 2 and 4 with the adjacent sections disposed so that the vapor openings 12 are located in diametrically opposed positions and with the vapor openings between strips 21 as shown in Fig. 4. When the jig is filled with packing sections to the extent desired, the holding member 28 is placed in the open end portion of the jig if it was not already in position, the upper section 18 is moved to closed position, thus bringing the contact strips 21 of the upper section into engagement with the edge portions of the packing sections, and the holding member 28 is moved inwardly to force the sections of the packing into contact with each other and against the closed end of the body portion, as shown in Fig. 2. The welding current is turned on, and it will flow into and through the strips 21 on one section of the body portion, and through the packing to the strips 21 on the other section of the body portion and will weld adjacent sections to each other at the points at which current enters and leaves the sections, or at the regions which are in contact with the strips 21. When the welding is completed, the upper section 18 is swung to open position, the welded packing is removed, and the jig is ready for the welding of other packing sections.

With this arrangement and operation, packing of the type referred to may be quickly and easily welded together to provide packing for any desired length of column within the limits of the jig.

As previously mentioned, the invention is not restricted in its application to the particular form of packing illustrated and described, but it may be used to weld packing of shapes other than frusto-conical, including but not limited to rectangular, triangular and polygonal.

Inasmuch as changes may be made in the form, location and relative arrangement of the several parts of the jig disclosed without departing from the principles of the invention, it will be understood that the invention is not to be limited excepting by the scope of the appended claims.

What is claimed is:

1. A jig for the electric resistance welding of articles together at their edges, comprising a tubular work holding member having separate contacts at its inner peripheral portion and disposed so as to engage the edges of the articles to be welded together when placed in said member, and means for connecting the contacts to opposite sides of an electric welding circuit.

2. A jig for the electric resistance welding of articles together at their edges, comprising an elongated tubular work holding member, elongated spaced contact members disposed at the inner peripheral portion of the work holding member and extending longitudinally thereof, said contacts being adapted to engage the edges of the articles to be welded together when placed in said work holding member, and means for connecting some of said contacts to one side of an electric welding circuit and other of said contacts to the other side of said circuits.

3. A jig for the electric resistance welding of articles together at their edges, comprising a tubular work holding member having separate contacts at its inner peripheral portion and disposed so as to engage the edges of the articles to be welded together when placed in said member, means for holding the articles to be welded against movement in the work member during welding, and means for connecting the contacts to opposite sides of an electric welding circuit.

4. A jig for the electric resistance welding of articles together at their edges, comprising a tubular work holding member having separate longitudinal sections adapted to be separated to admit the articles to be welded, separate contacts at the inner peripheral portion of said sections and disposed so as to engage the edges of the articles to be welded when said sections are placed together, and means for connecting the contacts to opposite sides of an electric welding circuit.

5. A jig for the electric resistance welding of articles together at their edges, comprising a tubular work holding member having two separate longitudinal sections, each section comprising substantially half of the tubular member, adapted to be separated to admit the articles to be welded, separate contacts at the inner peripheral portion of said sections and disposed so as to engage the edges of the articles to be welded when said sections are placed together, and means for connecting the contacts to opposite sides of an electric welding circuit.

6. A jig for the electric resistance welding of articles together at their edges, comprising a tubular work holding member having a top section and a bottom section hinged together, each section comprising substantially half the tubular member, separate contacts at the inner peripheral portion of said sections and disposed so as to engage the edges of the articles to be welded when said sections are in closed position, and means for connecting the contacts to opposite sides of an electroic welding circuit.

7. A jig for the electric resistance welding of articles together at their edges, comprising a tubular work holding member having two separate longitudinal sections, each section comprising substantially half of the tubular member, elongated spaced contact members disposed at the inner peripheral portion of each section of the work holding member and extending longitudinally thereof, said contacts being adapted to engage the edge of the articles to be welded together when placed in said work holding member, means for connecting the contact members of one section to one side of an electric welding circuit, and means for connecting the contact members in the other section to the other side of said circuit.

8. A jig for the electric resistance welding together of liquid and vapor contact devices of capillary material, said devices comprising a plurality of cells, each cell having two elements of capillary material of substantially concave-convex configuration disposed base to base, comprising a tubular work holding member adapted to receive a plurality of said cells therein, separate contacts at the inner peripheral surface portion of the work member disposed to engage said cells at the edges of the bases thereof so that the cells will be welded together at the edge of the base portions thereof, and means for connecting the contacts to opposite sides of an electric welding circuit.

9. A jig for the electric resistance welding together of liquid and vapor contact devices of capillary material, said devices comprising a plurality of cells, each cell having two elements of capillary material of substantially conical configuration disposed base to base, comprising a tubular work holding member adapted to receive a plurality of said cells therein, separate contacts at the inner peripheral surface portion of the work member disposed to engage said cells at the edges of the bases thereof so that the cells will be welded together at the edge of the base portions thereof, and means for connecting the contacts to opposite sides of an electric welding circuit.

10. A jig for the electric resistance welding together of liquid and vapor contact devices of capillary material, said devices comprising a plurality of cells, each cell having two elements of capillary material of substantially concave-convex configuration disposed base to base, comprising a tubular work holding member having separate longitudinal sections adapted to be separated to admit said cells, separate contacts at the inner peripheral portion of said sections and disposed so as to engage the edges of the bases of said cells so that the cells will be welded together at the edge of the base portions thereof, and means for connecting the contacts to opposite sides of an electric welding circuit.

11. A jig for the electric resistance welding together of liquid and vapor contact devices of capillary material, said devices comprising a plurality of cells, each cell having two elements of capillary material of substantially concave-convex configuration disposed base to base, comprising a tubular work holding member having separate longitudinal sections adapted to be separated to admit said cells, separate contacts at the inner peripheral portion of said sections and disposed so as to engage the edges of the bases of said cells so that the cells will be welded together at the edge of the base portions thereof, means for holding the cells against movement in the work member during welding, and means for connecting the contacts to opposite sides of an electric welding circuit.

12. A jig for the electric resistance welding together of liquid and vapor contact devices of capillary material, said devices comprising a plurality of cells, each cell having two elements of capillary material of substantially concavo-convex configuration disposed base to base, comprising a tubular work holding member having a top section and a bottom section hinged together, each section comprising substantially half the tubular member, elongated spaced contact members disposed at the inner peripheral portion of each section of the work holding member and extending longitudinally thereof, said contacts being adapted to engage the edges of the bases of said cells so that the cells will be welded together at the edge of the base portions thereof, means for connecting the contact members of one section to one side of an electric welding circuit, and means for connecting the contact members in the other section to the other side of said circuit.

LEIF NILSSEN.
SALVATORE JOSEPH FINELLI.